(12) United States Patent
    Davis

(10) Patent No.: US 11,448,307 B2
(45) Date of Patent: Sep. 20, 2022

(54) CONTINUOUSLY VARIABLE TRANSMISSION COOLING

(71) Applicant: Textron Inc., Providence, RI (US)

(72) Inventor: Hunter Scott Davis, Orlando, FL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 515 days.

(21) Appl. No.: 16/563,163

(22) Filed: Sep. 6, 2019

(65) Prior Publication Data

US 2019/0390761 A1      Dec. 26, 2019

Related U.S. Application Data

(63) Continuation of application No. 15/444,470, filed on Feb. 28, 2017, now Pat. No. 10,443,704.

(51) Int. Cl.
    | | |
    |---|---|
    | *F16H 9/18* | (2006.01) |
    | *F16H 57/027* | (2012.01) |
    | *F16H 57/035* | (2012.01) |
    | *F16H 57/04* | (2010.01) |

(52) U.S. Cl.
    CPC ........... *F16H 57/0416* (2013.01); *F16H 9/18* (2013.01); *F16H 57/027* (2013.01); *F16H 57/035* (2013.01); *F16H 57/0489* (2013.01)

(58) Field of Classification Search
    CPC ...... F16H 57/0416; F16H 9/18; F16H 57/027; F16H 57/035; F16H 57/0489
    USPC .......................................................... 474/8
    See application file for complete search history.

(56) References Cited

U.S. PATENT DOCUMENTS

| | | |
|---|---|---|
| 2,145,545 A * | 1/1939 | Johnson .................... F16H 9/16 474/93 |
| 4,697,665 A | 10/1987 | Eastman et al. |
| 6,149,540 A | 11/2000 | Johnson et al. |
| 6,176,796 B1 | 1/2001 | Lislegard |
| 6,267,700 B1 | 7/2001 | Takayama |
| 6,860,826 B1 | 3/2005 | Johnson |
| 6,938,508 B1 | 9/2005 | Saagge |
| 7,037,226 B2 | 5/2006 | Zulawski |
| 7,163,477 B1 | 1/2007 | Sherrod |
| 7,674,197 B2 | 3/2010 | Aitcin |
| 8,776,930 B2 | 7/2014 | Tadych et al. |
| 9,366,331 B2 | 6/2016 | Eberhardt |

(Continued)

*Primary Examiner* — Gene O Crawford
*Assistant Examiner* — Emily Rose Kincaid
(74) *Attorney, Agent, or Firm* — Sandberg Phoenix & von Gontard PC

(57) ABSTRACT

A continuously variable transmission (CVT), wherein the CVT includes a housing having an inner cover and an outer cover connected to the inner cover to provide the housing having an interior chamber defined therein. The CVT additionally comprises a clutch assembly disposed within the housing interior chamber, wherein the clutch assembly comprises a clutch post that is connectable to an output shaft of a vehicle prime mover, a movable sheave movably mounted on the clutch post, and a stationary sheave fixedly mounted on the clutch post opposite a front face of the movable sheave. The clutch assembly additionally comprises an intake fan fixedly mounted to the clutch post opposite a rear face of the movable sheave such that the intake fan is separate, independent and spaced apart from the movable sheave.

18 Claims, 10 Drawing Sheets

(56) References Cited

U.S. PATENT DOCUMENTS

| | | |
|---|---|---|
| 2004/0224806 A1* | 11/2004 | Chonan ............... F16H 57/0415 |
| | | 474/93 |
| 2006/0027192 A1* | 2/2006 | Tsukada ................... B60K 1/00 |
| | | 123/41.7 |
| 2006/0090942 A1 | 5/2006 | Hastings |
| 2006/0270503 A1* | 11/2006 | Suzuki ................ F16H 57/0415 |
| | | 474/93 |
| 2012/0289370 A1 | 11/2012 | Yamanishi et al. |
| 2013/0090199 A1 | 4/2013 | Itoo et al. |
| 2013/0220766 A1* | 8/2013 | Tadych ................. F04D 29/281 |
| | | 416/204 R |
| 2015/0024890 A1 | 1/2015 | Eberhardt |
| 2015/0284003 A1 | 10/2015 | Gauthier et al. |
| 2016/0061314 A1* | 3/2016 | Kuhl ..................... F16H 57/027 |
| | | 474/8 |
| 2016/0281837 A1 | 9/2016 | Eberhardt |
| 2017/0045134 A1* | 2/2017 | Wade ................. F16H 57/0427 |
| 2018/0245682 A1 | 8/2018 | Davis |
| 2018/0306309 A1 | 10/2018 | Steinert |

* cited by examiner

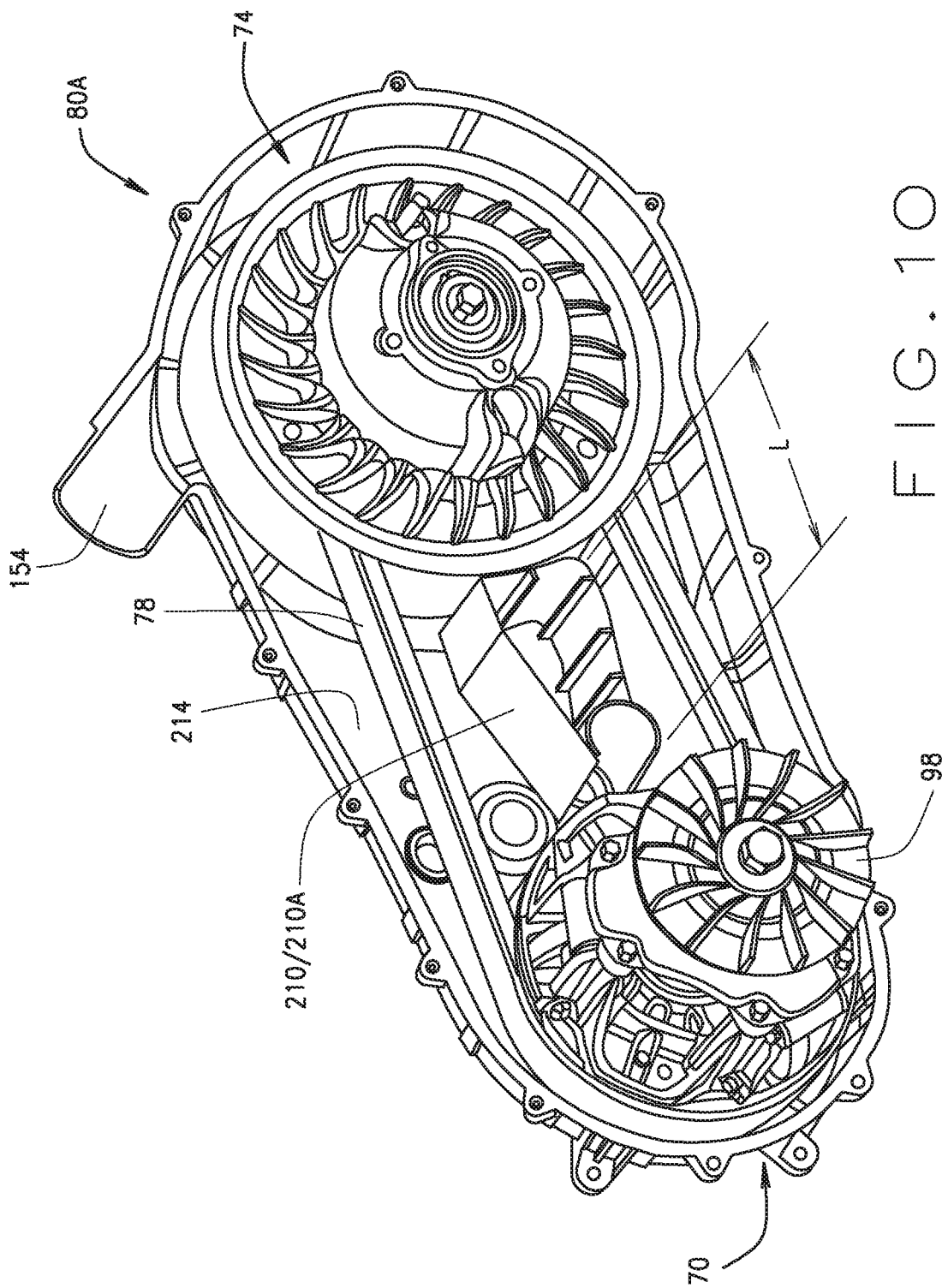

US 11,448,307 B2

CONTINUOUSLY VARIABLE TRANSMISSION COOLING

CROSS-REFERENCE TO RELATED APPLICATIONS

This application is a continuation of U.S. patent application Ser. No. 15/444,470 filed on Feb. 28, 2017, the disclosure of which is incorporated herein by reference in its entirety.

FIELD

The present teachings relate to continuously variable transmissions (CVTs), and more particularly to systems and method for cooling CVTs.

BACKGROUND

The statements in this section merely provide background information related to the present disclosure and may not constitute prior art.

Many of today's lightweight vehicles that are not designated for use on roadways, e.g., all-terrain vehicles (ATVs), utility terrain vehicles (UTVs), etc., implement a continuously variable transmission (CVT) to transfer and control the distribution of torque within the vehicle drivetrain. Due to the dust, water, mud, rocks, etc., commonly encountered in off-road environments, such CVTs typically comprise a housing or cover designed to protect the components, e.g., primary clutch, secondary clutch, bushings, belts, etc., from the environment. However, such covers substantially enclose the components and trap heat generated during operation of the CVT such that the components do not easily cool off causing degradation in the life of the components. Additionally, in higher horsepower vehicles, greater heat is generated, which will degrade the internal parts of the CVT faster. Known system designs for cooling the internal components of CVTs have a fan located on the inside, or stationary, sheave of the primary clutch and/or the outside, or stationary, sheave of the secondary clutch. However, such locations limit the size that the fan can be and typically require that the fan be integrally formed in the respective sheave.

SUMMARY

In various embodiments, the present disclosure provides a continuously variable transmission (CVT), wherein the CVT includes a housing that comprises an inner cover and an outer cover. The inner and outer covers are connected to form the housing such that the housing has an interior chamber. The CVT additionally includes a clutch assembly disposed within the housing interior chamber. In various embodiments, the clutch assembly comprises a clutch post that is connectable to an output shaft of a vehicle prime mover, a movable sheave movably mounted on the clutch post, and a stationary sheave fixedly mounted on the clutch post opposite a front face of the movable sheave. The clutch assembly additionally comprises an intake fan fixedly mounted to the clutch post opposite a rear face of the movable sheave such that the intake fan is separate, independent and spaced apart from the movable sheave.

While the present disclosure is primarily described with regard to an air induction cooled CVT for use in an off-road utility vehicle, it should be understood that the features of the CVT disclosed herein can be applied, within the scope of the disclosure, to other types of vehicles such as most lightweight vehicles that are not designated for use on roadways, e.g., maintenance vehicles, cargo vehicles, shuttle vehicles, golf carts, other all-terrain vehicles (ATVs), utility task vehicles (UTVs), recreational off-highway vehicles (ROVs), side-by-side vehicles (SSVs), worksite vehicles, buggies, motorcycles, watercrafts, snowmobiles, tactical vehicles, etc.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Figure 6:
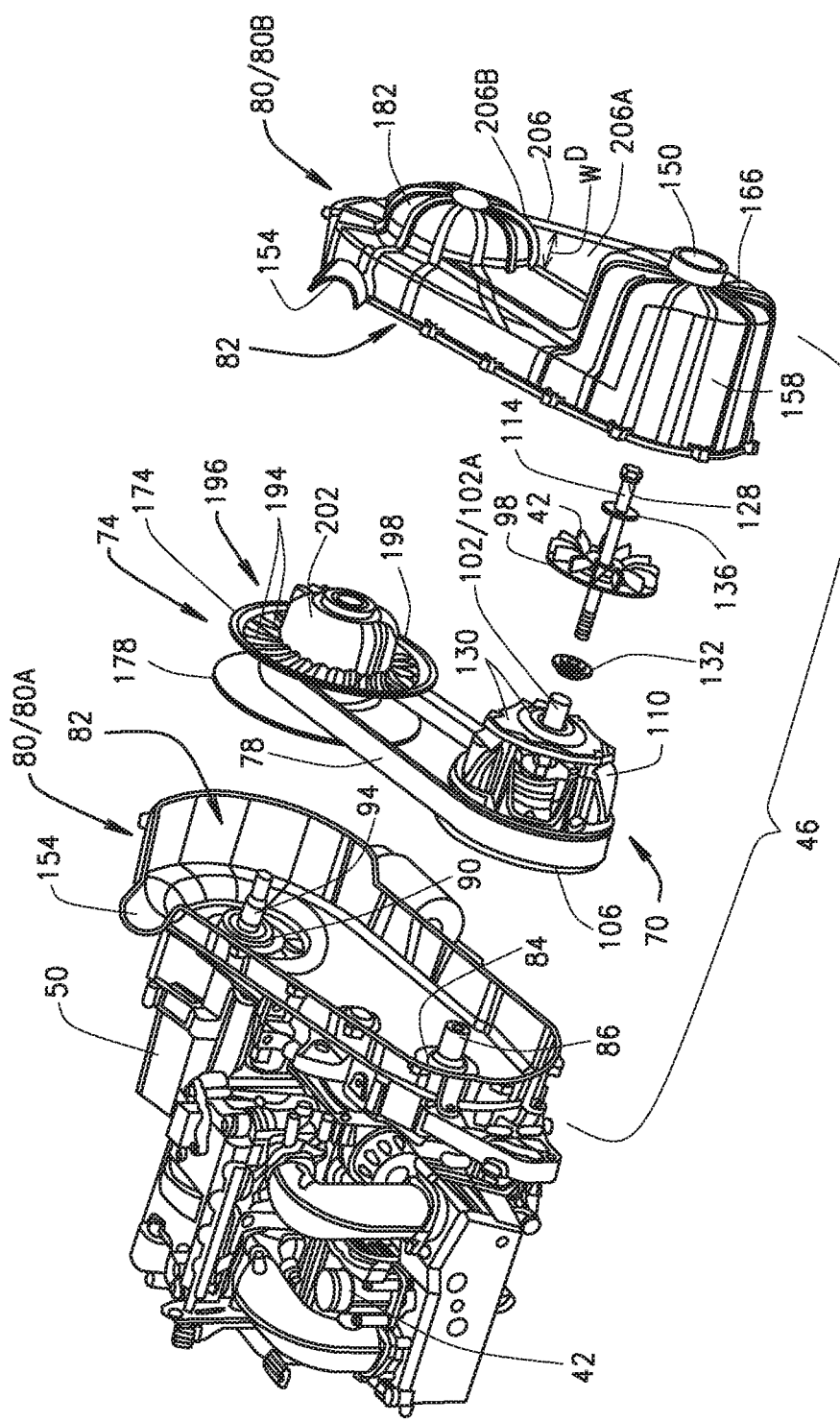
FIG. 6 is an isometric exploded view of the CVT shown in FIG. 1 operably coupled to an engine and gearbox of the vehicle shown in FIG. 1, and having an air flow control housing outer cover, in accordance with various embodiments of the present disclosure.
Figure 7:
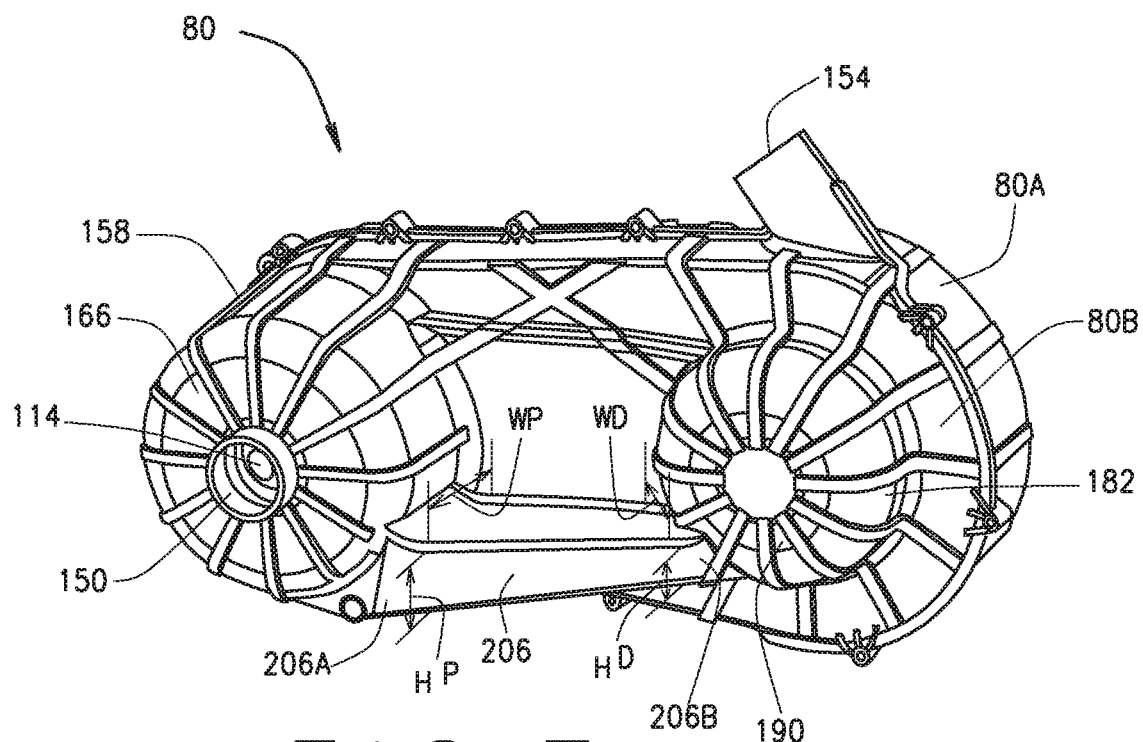
FIG. 7 is an isometric view of the CVT housing with the air flow control housing outer cover shown in FIG. 6, in accordance with various embodiments of the present disclosure.
Figure 9:
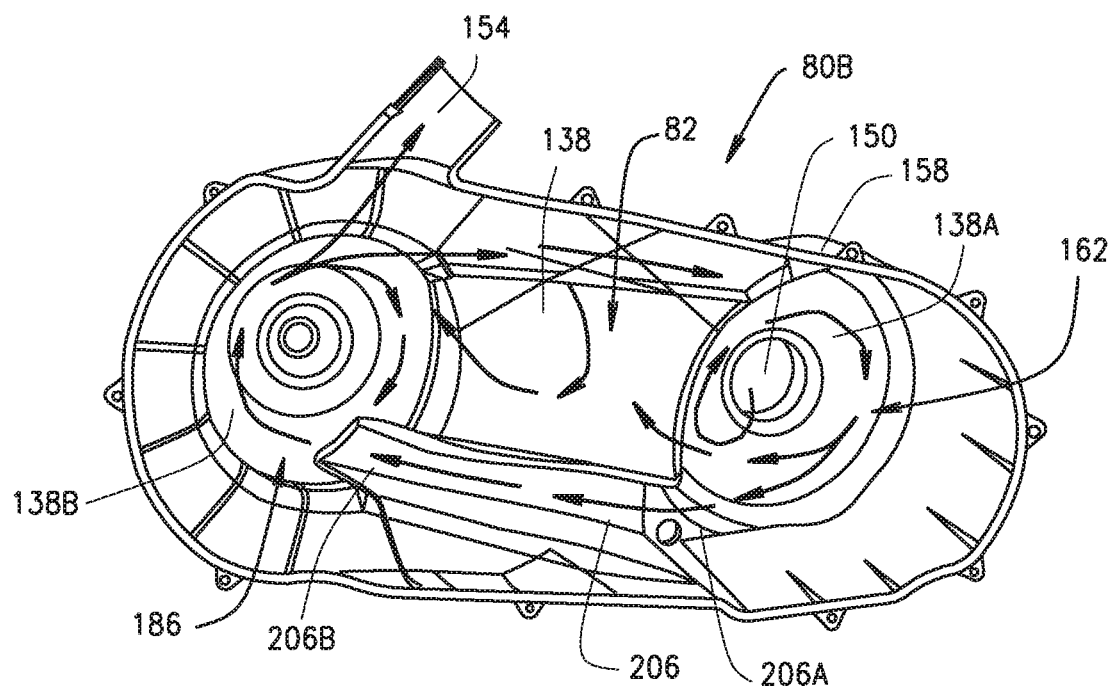

FIG. 9 an isometric view of an interior side of the outer cover shown in FIGS. 6 and 7, in accordance with various embodiments of the present disclosure.

Figure 3:
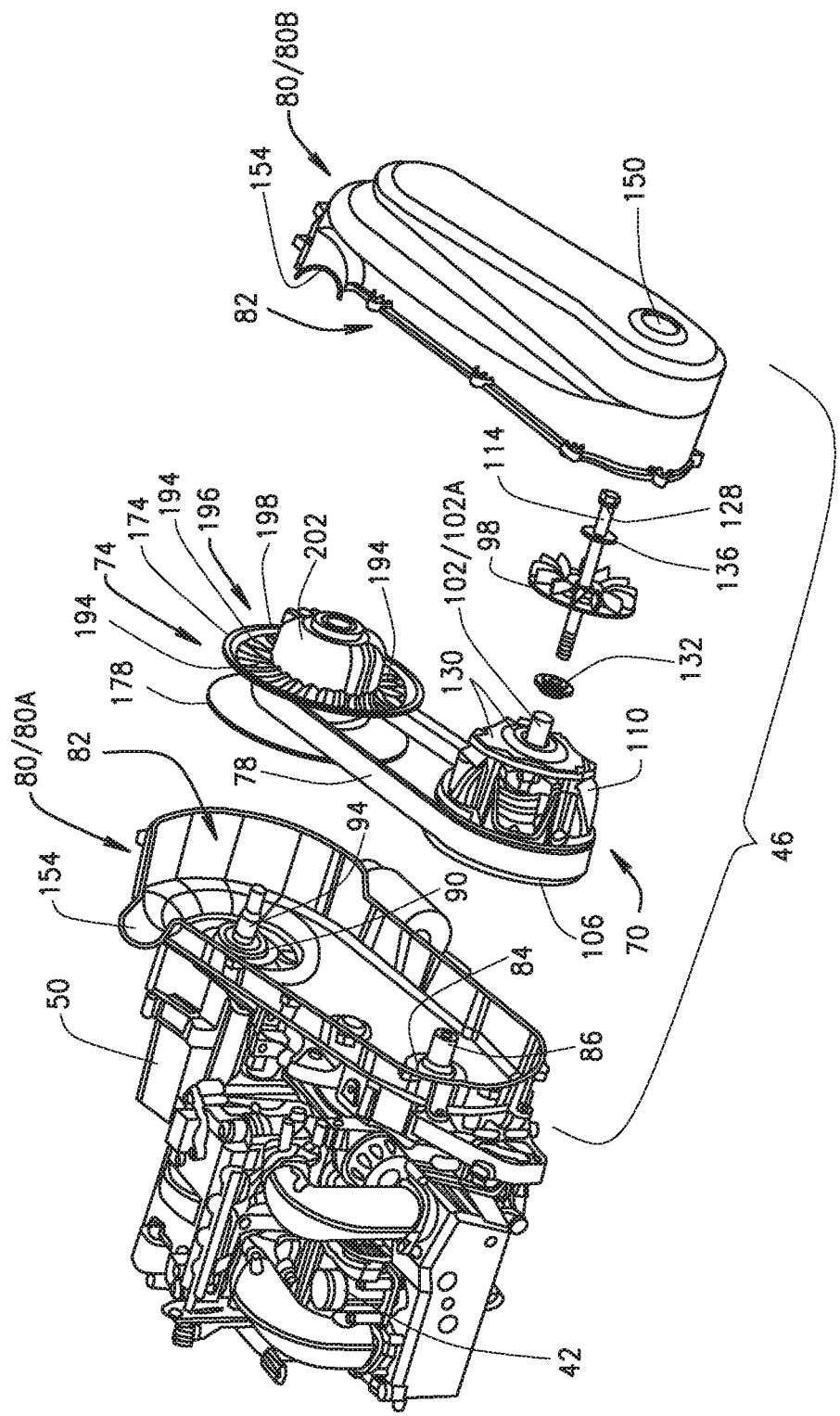
FIG. 3 is an isometric exploded view of the CVT shown in FIG. 1 operably coupled to an engine and gearbox of the vehicle shown in FIG. 1, in accordance with various embodiments of the present disclosure.

FIG. 10 is a view of an interior face of an inner cover of the housing shown in FIGS. 3 and 6 having an airfoil, in accordance with various embodiments of the present disclosure.

Figure 11:
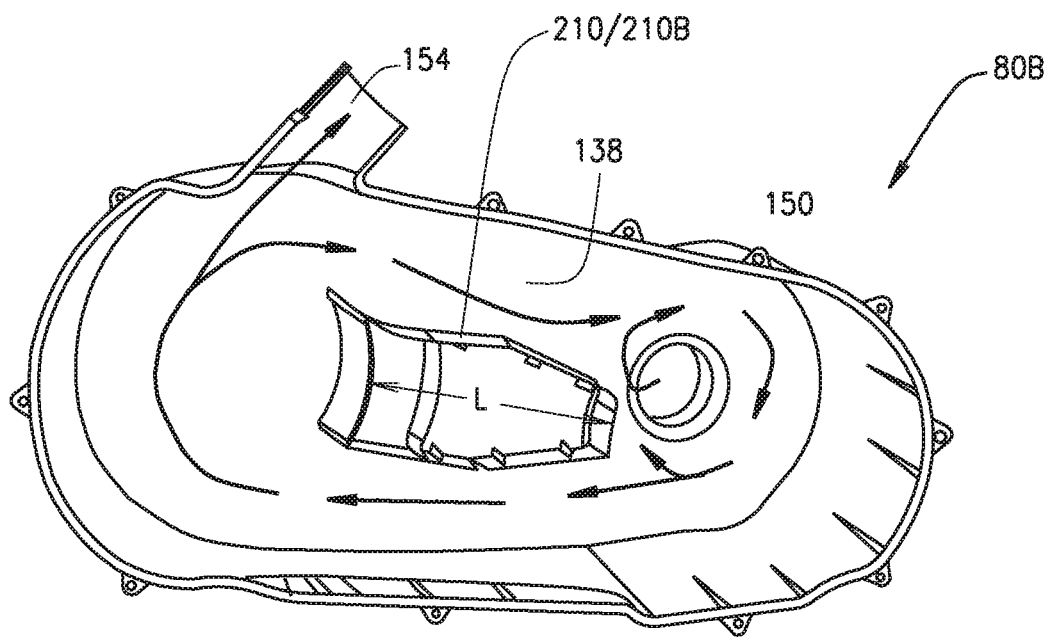

FIG. 11 is a view of the interior face of the housing outer cover shown in FIG. 3 having an airfoil, in accordance with various embodiments of the present disclosure.

Figure 8:
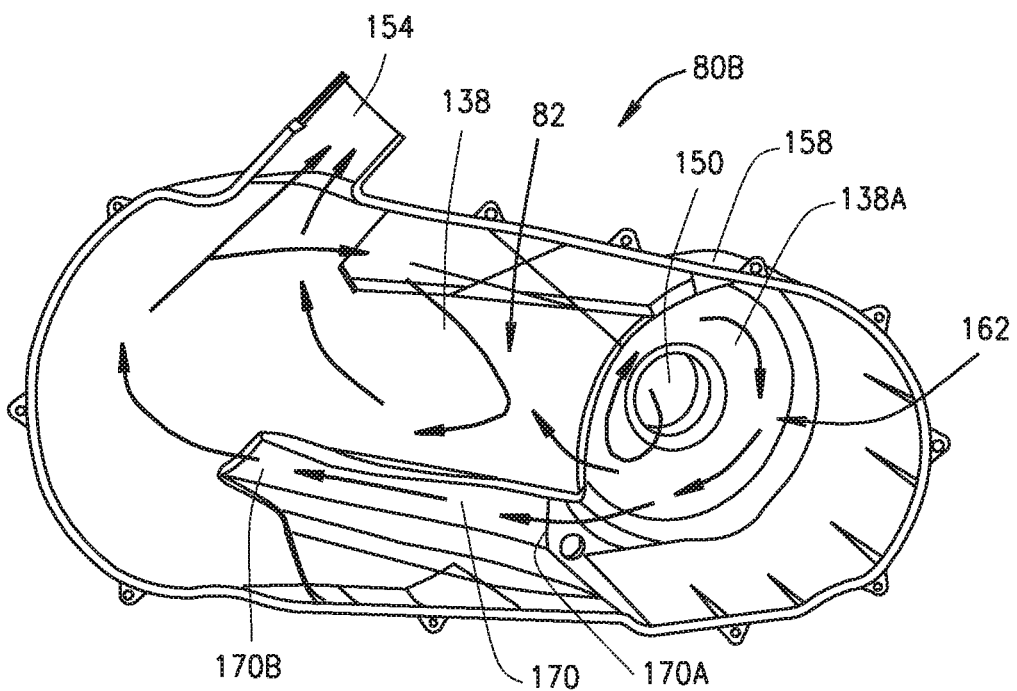
FIG. 8 is an isometric view of an interior side of an air flow control housing outer cover, in accordance with various other embodiments of the present disclosure.
Figure 12:
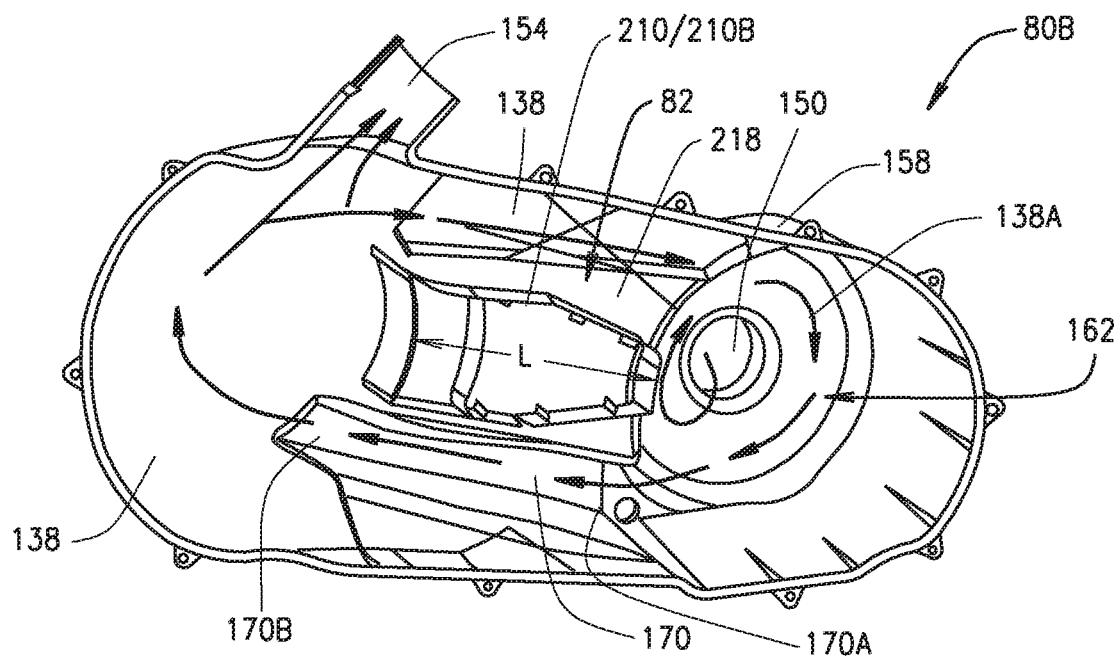

FIG. 12 is a view of the interior face of the housing outer cover shown in FIG. 8 having an airfoil, in accordance with various embodiments of the present disclosure.

Figure 13:
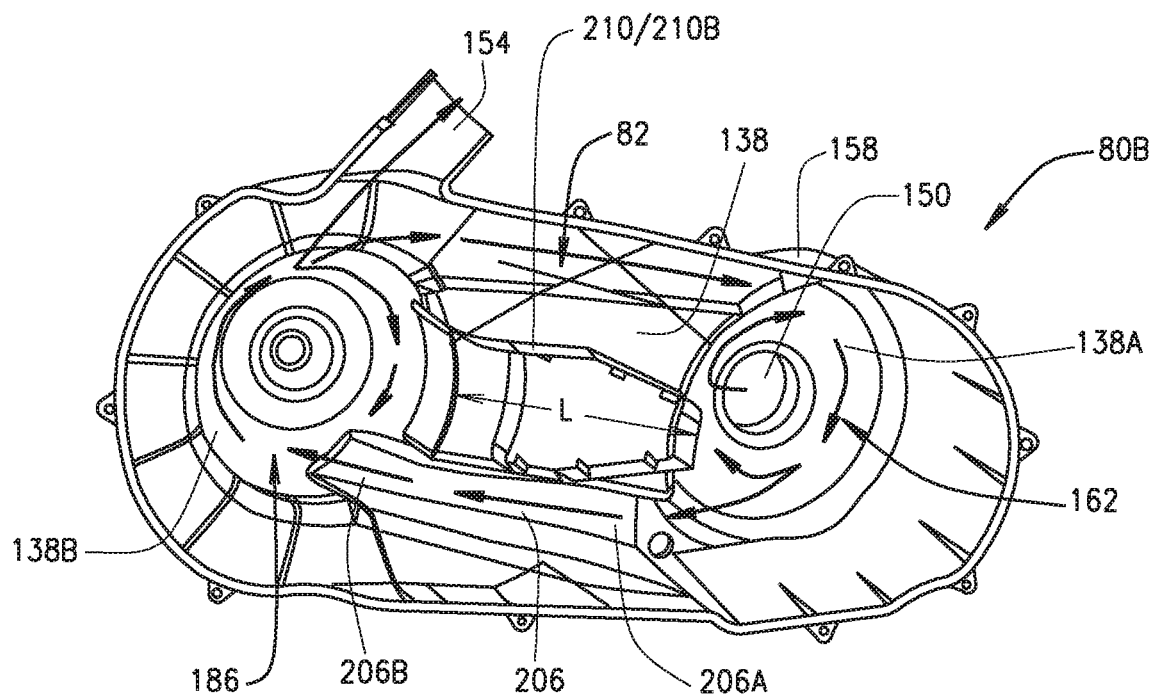

FIG. 13 is a view of the interior face of the housing outer cover shown in FIGS. 6, 7 and 9 having an airfoil, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
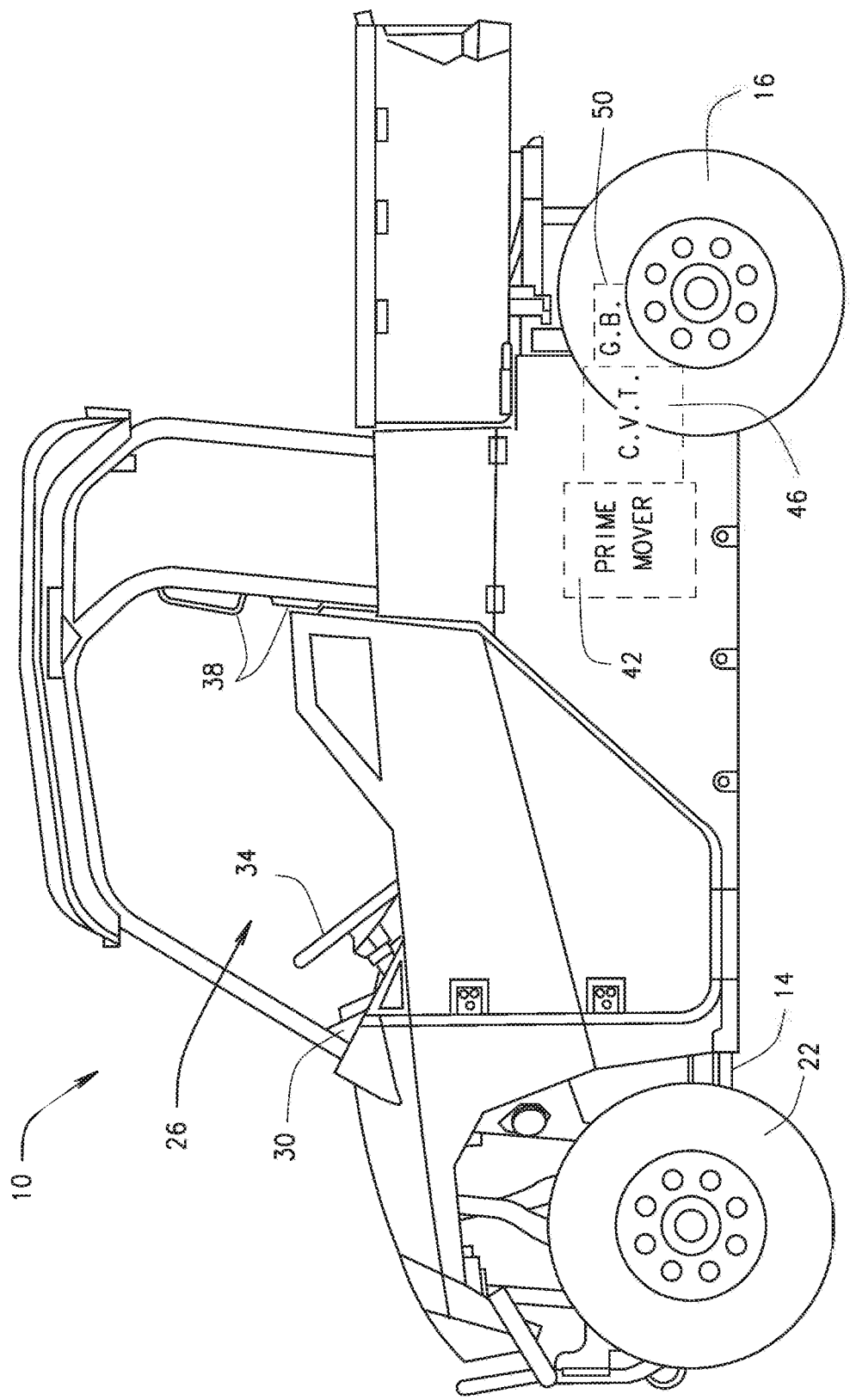
FIG. 1 is a side view of a utility vehicle including an air induction cooled continuously variable transmission (CVT), in accordance with various embodiments of the present disclosure.
Figure 2:
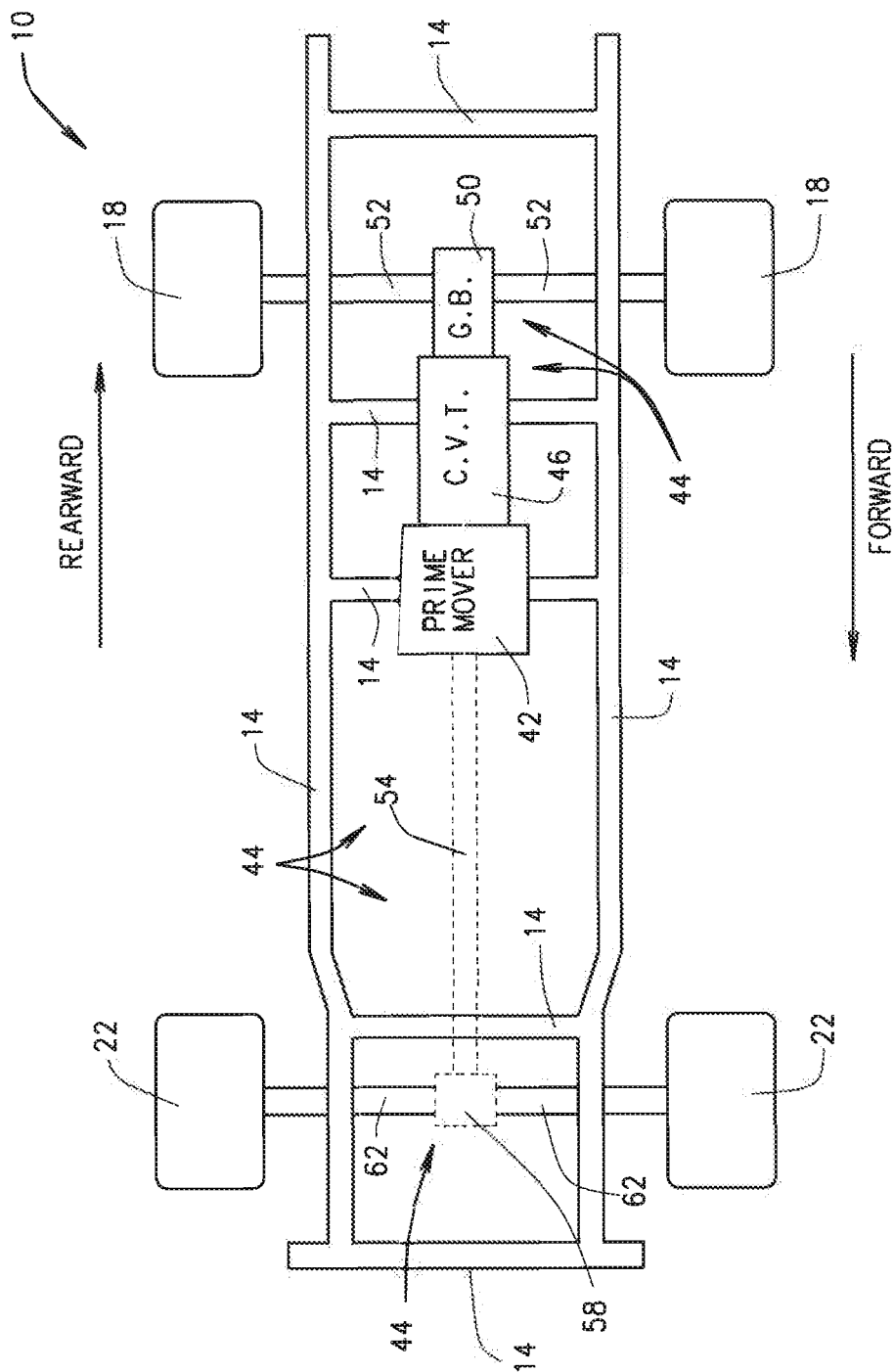
FIG. 2 is a schematic of a chassis, a prime mover and a drivetrain of the vehicle shown in FIG. 1, in accordance with various embodiments of the present disclosure.

Referring to FIGS. 1, 2 and 3, in various embodiments, the present disclosure provides an off-road utility vehicle 10 that generally includes a chassis or frame 14, a pair of rear wheels 18 and a pair of front wheels 22 operationally connected to the chassis 14 and/or other structure of the vehicle 10, and a passenger compartment 26. The vehicle 10 can be any four-wheel drive or two-wheel drive lightweight vehicle that is not designated for use on roadways. For example, it is envisioned that the vehicle 10 can be a maintenance vehicle, cargo vehicle, shuttle vehicle, golf cart, other all-terrain vehicles (ATV), utility task vehicle (UTV), recreational off-highway vehicle (ROV), side-by-side vehicle (SSV), worksite vehicle, buggy, motorcycle, watercraft, snowmobile, tactical vehicle, etc. The passenger compartment 26 generally includes a dash console 30, a steering wheel 34, a floorboard (not shown, but understood), and a passenger seating structure 38. The vehicle 10 additionally includes a prime mover 42 mounted to the chassis 14, and a drivetrain 44 operationally connected to at least one of the front and/or rear wheels 22 and/or 18 and the prime mover 42. The prime mover 42 is structured and operable to generate torque (e.g., motive force, e.g., power) utilized to provide motive force for the vehicle 10 via the drivetrain 44. Although the prime mover 42 is primarily described herein as an internal combustion engine (ICE), it should be understood that the prime mover 42 can be an electric motor, a hybrid combination of an ICE and an electric motor, or any other suitable motor or engine and remain within the scope of the present disclosure.

In various embodiments, the drivetrain 44 includes an air induction cooled continuously variable transmission (CVT)

46 that is operably connected to the prime mover 42 to receive torque (e.g., motive force, e.g., power) from the prime mover 42, and operably connected to at least one of the rear and front wheels 18 and 22 to deliver torque to at least one of the rear and front wheels 18 and 22. In various embodiments, the CVT 46 can be operably connected to at least one of the rear wheel(s) 18 and the front wheel(s) 22 via one or more rear and/or front wheel axles 52 and/or 62 that are operably connected to the CVT 46. Additionally, in various embodiments the CVT 46 can be operably connected to at least one of the rear and front wheels 18 and 22 via a first gearbox 50. In such embodiments, the first gearbox 50 is operably connected to the CVT 46 and at least one rear and front wheel 18 and 22 is operably connected to the first gearbox 50 via one or more rear and/or front wheel axles 52 and/or 62 and/or a driveshaft 54. For simplicity, the CVT 46 will be described herein as operably connected to at least one of the rear and front wheels 18 and 22 via the first gearbox 50. The first gearbox 50 can be a torque transfer device such as a transmission and/or a differential and/or a transaxle, etc. For example, in various implementations, the first gearbox 50 can be a multi-speed gearbox and, in various instances, include a differential for distributing the torque to one or more of the wheels 18 and/or 22.

In various embodiments, the CVT 46 is structured and operable to receive torque (e.g., motive force, e.g., power) generated by the prime mover 42 and controllably transfer the torque to the first gearbox 50. Particularly, when transferring the torque to the first gearbox 50, the CVT 46 is structured and operable to controllably vary the amount of torque delivered to the gearbox 50. That is, the amount of torque delivered can controllably be increased, decreased and/or not changed via operation of the CVT 46. The first gearbox 50 is structured and operable to transfer and distribute the torque to one or more of the wheels 18 and/or 22. For example, in various embodiments, the first gearbox 50 can be operably connected to a rear axle 52 and structured and operable to transfer and distribute the torque output by the CVT 46 to at least one of the rear wheels 18. In various other embodiments, in addition to transferring and distributing the torque to at least one of the rear wheels 18, the first gearbox 50 can include a power take off (PTO) such that the first gearbox 50 can also transfer and distribute the torque output by the CVT 46 to at least one of the front wheels 22. In such embodiments, the drivetrain 44 can include a driveshaft 54 and a second gearbox (or differential) 58, wherein the driveshaft 54 is operably connected at one end to the CVT 46 or the first gearbox 50 via the PTO and operably connected at the opposing end to the second gearbox 58. The second gearbox 58 is structured and operable to transfer and distribute the torque output by the CVT 46 to one or more of the front wheels 22 via a front axle 62.

Hence, in various embodiments, the drivetrain 44 can be configured to provide a 4-wheel drive (4WD) vehicle or a 2-wheel drive (2WD) vehicle, and remain within the scope of the present disclosure. In various embodiments in which the drivetrain 44 is configured to provide a 2WD vehicle, the vehicle 10 can be driven by the rear wheels 18 (e.g., a rear wheel drive vehicle) or by the front wheels 22 (e.g., a front wheel drive vehicle). In some embodiments in which the vehicle 10 can be configured as a 4WD vehicle, the vehicle 10 can be selectively operated in two or more drive modes, such as a 2WD mode and a 4WD mode, through actuation of a switch or other user input device that can be disposed on the instrument panel 30, or elsewhere.

Additionally, although the prime mover 42 and CVT 46 are illustrated, by way of example, in the various figures to be at least partially disposed rearward of a longitudinal center of the vehicle 10, it is envisioned that the prime mover 42 and CVT 46 can be disposed anywhere along a longitudinal axis of the vehicle 10 and remain within the scope of the present disclosure. For example, in various embodiments, the prime mover 42 and/or the CVT 46 can be disposed forward of the longitudinal center of the vehicle 10, e.g., forward of a forward most part of the seating structure 38. Furthermore, although the prime mover 42, the CVT 46, and the first gearbox 50 are shown, by way of example, to be directly connected with each other, it should be understood that the drivetrain 44 can include one or more driveshafts (such as driveshaft 54) that operably interconnect one or more of the prime mover 42, the CVT 46, the first gearbox 50 and/or the second gearbox 58 based on the respective location of the prime mover 42 and CVT 46 along the vehicle longitudinal axis, and the respective 2WD or 4WD configuration of the drivetrain 44.

As used herein, the word "forward" and the phrase "forward of" are used to describe the direction from a named component or structure toward the front of the vehicle 10. For example, the statement that the prime mover 42 is mounted to the chassis 14 "forward of" the longitudinal center means the prime mover 42 is mounted to the chassis 14 within an area that extends from the longitudinal center of the chassis 14 to the front of the chassis 14 at the front of the vehicle 10 (e.g., adjacent the front wheels 22 positioned at the front of the vehicle 10 in the illustrated embodiment). Similarly, as used herein, the word "rearward" and the phrase "rearward of" are used to describe the direction from a named component or structure toward the rear of the vehicle 10. For example, the statement that the prime mover 42 is mounted to the chassis 14 "rearward of" the longitudinal center means the prime mover 42 is mounted to the chassis 14 within an area that extends from the longitudinal center of the chassis 14 to the rear of the chassis 14 at the rear of the vehicle 10 (e.g., adjacent the rear wheels 18 positioned at the rear of the vehicle 10 in the illustrated embodiment).

Referring now to FIG. 3, the CVT 46 generally includes a primary clutch assembly 70, a secondary clutch assembly 74, a drive belt 78 that operably connects the primary clutch assembly 70 to the secondary clutch assembly 74 and housing 80. The housing 80 is structured to enclose the primary clutch assembly 70, secondary clutch assembly 74, and drive belt 78 within an interior chamber 82 of the housing 80. The housing 80 protects the primary clutch assembly 70, the secondary clutch assembly 74, the drive belt 78 from water, mud, dirt and other debris present in the ambient (exterior) environment. In various embodiments, the housing 80 comprises an inner cover 80A and an outer cover 80B that is connectable to the inner cover 80A to define the interior chamber 82. The inner cover 80A includes a torque/power input opening 84 that is sized and shaped to allow an output shaft 86 of the prime mover 42 to extend therethrough. The inner cover 80A additionally includes a torque/power output opening 90 that is sized and shaped to allow the secondary clutch assembly 74 to be operably connected, (e.g., via the first gearbox 50) to at least one of the rear and/or front axles 52 and/or 62 such that torque/power output by the secondary clutch assembly 74 is delivered to at least one of the rear and/or front wheels 18 and/or 22. For example, in various instances, the torque/power output opening 90 can be sized and shaped to allow an input shaft 94 of the first gearbox 50 to extend therethrough.

The primary clutch assembly 70 is operably connectable to the prime mover output shaft 86 such that torque/power generated by the prime mover 42 will be delivered to the primary clutch assembly 42, whereafter, via the drive belt 78, the primary clutch assembly 70 will transfer torque/power to the secondary clutch assembly 74. Thereafter, the torque/power received at the secondary clutch assembly 74 will be delivered to at least one of the rear and/or front axles 52 and/or 62. For example, in various embodiments wherein the drivetrain 44 includes the first gearbox 50, the secondary clutch assembly 74 can transfer the received torque/power to the first gearbox 50, via the first gearbox input shaft 94, and consequently to the rear and/or front axles 52 and/or 62.

In various embodiments, the primary clutch assembly 70 is structured and operable to deliver a continuously variable torque to the secondary clutch assembly 74. That is, the primary clutch assembly 70 is structured and operable to continuously variably increase, maintain unchanged, and decrease the torque/power received from the prime mover output shaft 86 when transferring the torque/power to the secondary clutch assembly 74. Put another way, a torque/power transfer ratio of the torque/power received by the primary clutch assembly 70 from the prime mover 42 versus the torque/power delivered to the secondary clutch assembly 74 from the primary clutch assembly 70 can be continuously varied via operation of the primary clutch assembly 70.

Figure 4:
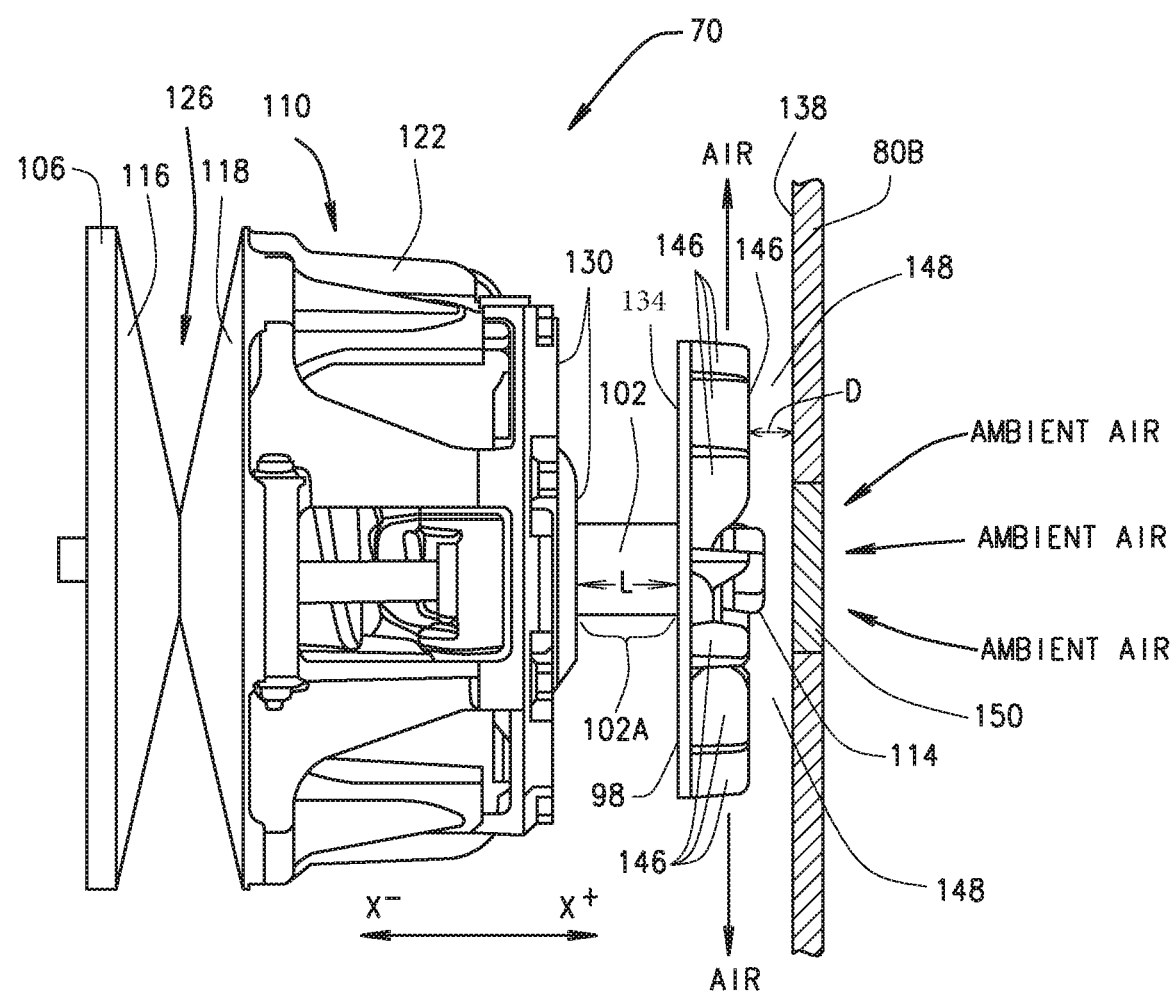
FIG. 4 is a side view of a clutch assembly of the CVT shown in FIGS. 1 and 3, in accordance with various embodiments of the present disclosure.
Figure 5:
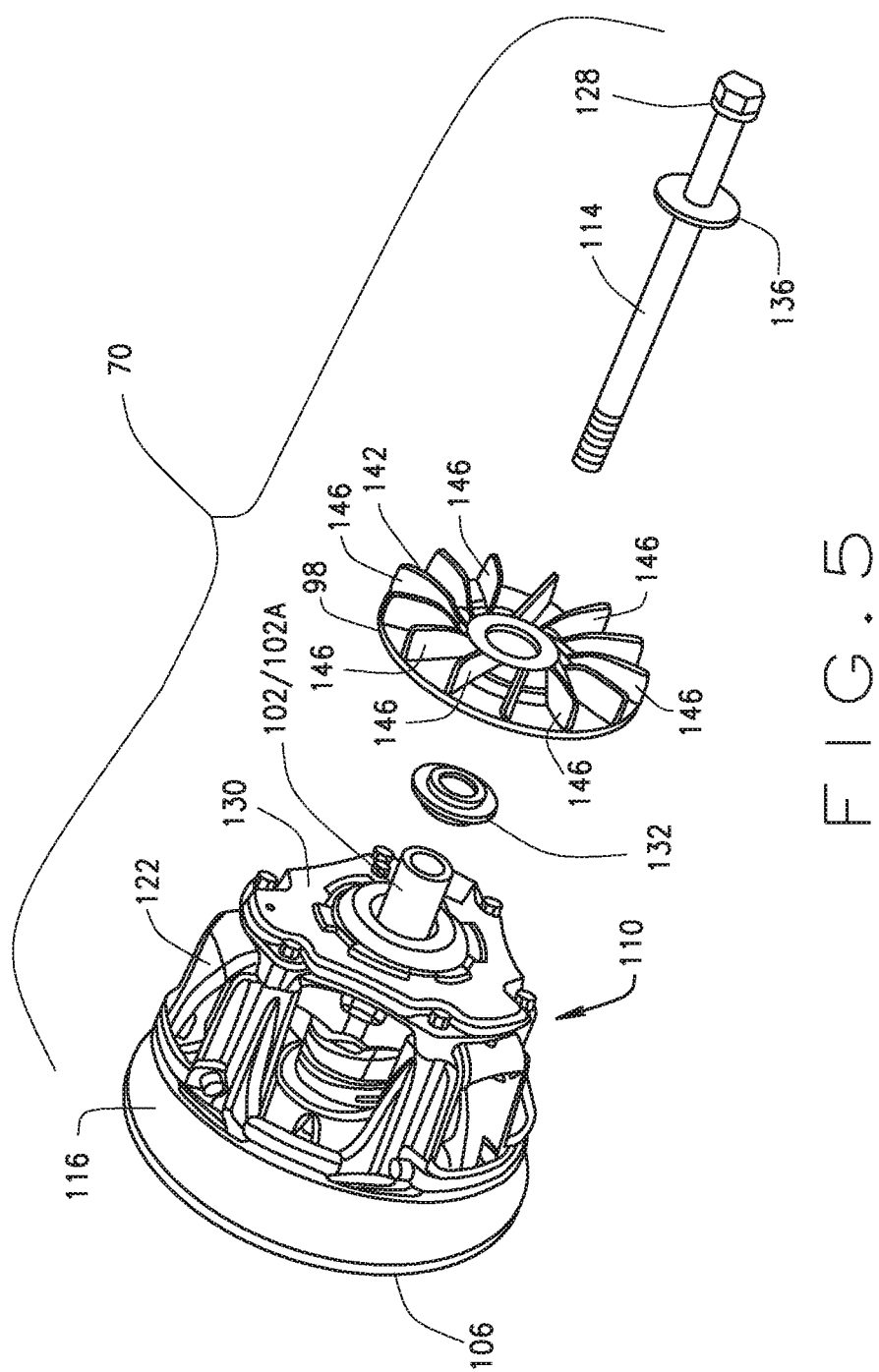
FIG. 5 is an isometric exploded view of the clutch assembly shown in FIG. 4, in accordance with various embodiments of the present disclosure.

Referring now to FIGS. 3, 4 and 5, in various embodiments, one or both of the primary and secondary clutch assemblies 70 and/or 74 can comprise the following components that are structured and operable to function in the manner described below. Particularly, in various embodiments, one or both of the primary and secondary clutch assemblies 70 and/or 74 can comprise an intake fan 98 as described below. However, for simplicity and clarity, by way of example, only the primary clutch assembly 70 will be described to comprise the intake fan 98 and the operation and functionally of the intake fan 98 will be described, by way of example, only with regard to the primary clutch assembly 70. However, it will be easily and readily understood by one skilled in the art that the description herein relating to the intake fan 98 with regard to embodiments of the primary clutch assembly 70 is merely an example, and such description is equally applicable with regard to embodiments of the secondary clutch 74 and is wholly within the scope of the present disclosure.

In various embodiments, the primary clutch assembly 70 comprises a clutch post 102, a stationary (or static) sheave 106 that is fixedly mounted to the clutch post 102, and a movable (or dynamic) sheave 110 that is movably mounted to the clutch post 102. The clutch post 102, and hence the primary clutch assembly 70, is fixedly connectable to the prime mover output shaft 86 via a clutch bolt 114 such that the primary clutch assembly 70 will rotate in accordance with rotation of the output shaft 86 and will thereby receive the torque/power generated by the prime mover 42. More particularly, the movable sheave 110 is structured and operable to rotate with the output shaft/clutch post 86/102 and simultaneously controllably move axially along the clutch post 102 in the X⁺ and X⁻ directions. The stationary sheave 106 includes a beveled front face 116. Similarly, the movable sheave 110 comprises a beveled front face 118 that is disposed opposite (e.g., disposed face to face) the stationary sheave beveled front face 116. The movable sheave 110 further includes a linear movement mechanism 122 that is structured and operable to controllably move the movable sheave 110 axially along the clutch post 102 in the X⁺ and X⁻ directions. A V-shaped channel 126 is formed between the opposing beveled front faces 116 and 118 of the stationary and movable sheaves 106 and 110, and the drive belt 78 is disposed within the V-shaped channel 126. Controlled axial movement of the movable sheave 110 in the X⁺ and X⁻ directions along the clutch post 102, via the linear movement mechanism 122, varies a width of the V-shaped channel 126. The controlled varying of the channel 126 varies a diameter, or radial distance from the clutch post 102, at which the drive belt 78 travels within the V-shaped channel 126, which in turn various the torque transfer ratio of the primary clutch assembly 70 to the secondary clutch assembly 74. Therefore, the torque/power output by the secondary clutch assembly 74 (e.g., the torque/power output by the secondary clutch assembly 74 to the first gearbox 50) can be controllably varied by the controlled linear movement of the movable sheave 110.

In various embodiments, the axial movement of the movable sheave 110 along the clutch can be controlled by a vehicle controller and/or a CVT controller (not shown). Such a CVT controller can be a controller that is communicatively connected to, or integrated as part of, a main vehicle controller that is typically understood to be an embedded system that controls one or more of electrical systems and/or subsystems the vehicle 10. Generally, such a CVT controller can be any suitable hardware and/or software (e.g., software instructions stored on a non-transitory computer readable medium that can be read and performed by one or more processors) based controller that is structured and operable to control operation of the CVT 46 as described herein. For example, it is envisioned that such a CVT controller can comprise one or more, or be part of, application specific integrated circuit(s) (e.g., ASIC(s)), combinational logic circuit(s); field programmable gate array(s) (FPGA); processor(s) (shared, dedicated, or group) that execute software code; and/or other suitable hardware components that provide the CVT functionality described herein and remain within the scope of the present disclosure.

As described above, by way of example, in various embodiments, the primary clutch assembly 70 includes the intake fan 98. More particularly, in such embodiments, the intake fan 98 is fixedly mounted to the clutch post 102 opposite a back face 130 of the movable sheave 110 (e.g., disposed face to face, e.g., disposed with movable sheave back face 130 facing fan back face 134) such that the intake fan 98 is independent, separate, distinct and spaced apart from the back face 130 of the movable sheave 110. More specifically, the intake fan 98 is an independent, separate, distinct component of the primary clutch assembly 70 and is independent, separate and distinct from both the stationary and movable sheaves 106 and 110. The intake fan 98 can be mounted to the clutch post 102 in any suitable manner. For example, in various embodiments, the intake fan 98 can be compressed between a lock washer 128, a retaining washer 132 and a head washer 136 as the clutch bolt 114 is tightened to fixedly connect the intake fan 98 to the clutch post 102. The retaining washer 132 and head washer 136 allows most or substantially all the compressive force to transfer through the lock washer 128, head washer 136, and retaining washer 132 and not through the intake fan 98. In various instances, the retainer washer 132 is structured to ensure that the intake fan 98 is centered on the clutch post 102.

In various embodiments, a slack section 102A of the clutch post 102 generally extends beyond the back face 130 of the movable sheave 110. As described above, during operation of the primary clutch assembly 70, the movable sheave 110 controllably moves, or transitions, (via operation of the linear movement mechanism 122) along the clutch post 102 in the X⁻ and X⁺ directions to adjust the space between the beveled front faces 116 and 118 to controllably adjust the torque/power transferred to the secondary clutch assembly 74. Moreover, as the moveable sheave 110 moves/transitions in the X⁻ and X⁺ directions along the clutch post 102, a length L of the slack section 102A will increase and decrease. The length L is defined to be the distance between the back face 130 of the movable sheave 110 and a back face 134 of the intake fan 98. For example, the length L of the slack section 102A will be a maximum length when the movable sheave 110 is moved/transitioned as far in the X⁻ direction toward the stationary sheave 106 as the operational limits of the primary clutch assembly allow. Conversely, the length L of the slack section 102A will be a minimum length when the movable sheave 110 is moved/transitioned as far in the X⁺ direction away from the stationary sheave 106 as the operational limits of the primary clutch assembly allow.

Still more particularly, the clutch post 102 is structured to have a length (not shown but understood) such that the length L of the slack section 102A allows the moveable sheave 110 to move as far in the X⁺ direction away from the stationary sheave 106 as the operational limits of the primary clutch assembly allow without the back face 130 of the moveable sheave 110 contacting the back face 134 of the intake fan 98. In various embodiments, the slack section of the clutch post 102 can be between 1.0 inches and 2.50 inches. Furthermore, in various embodiments the minimum length of the clutch post slack length 102A (e.g., the length of the slack length L when the movable sheave 110 is moved/transitioned as far in the X⁺ direction away from the stationary sheave 106 as the operational limits of the primary clutch assembly allow) can be between 0.05 and 0.50 inches. Hence, the length of clutch post 102 and the length L of the clutch post slack section 102A are such that the primary clutch (e.g., the stationary and movable sheaves 106 and 110) can operate (e.g., the movable sheave 110 can controllably move/transition along the clutch post 102 the X⁻ and X⁺ directions) without the movable sheave 110 contacting the intake fan 98. Particularly, the length of clutch post 102 and the length L of the clutch post slack section 102A are such that the location and orientation of the intake fan 98 within the CVT housing 80 is generally fixed and does not change. More particularly, the location and orientation of the intake fan 98 relative to an interior face 138 of the housing outer cover 80B is generally fixed and does not change. Still more particularly, the length of clutch post 102 and the length L of the clutch post slack section 102A are such that an outer face 142 of the intake fan 98 is generally a fixed distance D from the interior face 138 of the outer housing cover 80B.

The intake fan 98 comprises a plurality of fins 146 that define the outer face 142 of the intake fan 98. The size, shape and dimensions of the intake fan 98 can be any desired size, shape and dimensions suitable for desirably cooling the respective CVT 46 when operated in the respective application and environment. Additionally, the size, shape, dimensions, number and configuration of the fins 146 can be any desired size, shape, dimensions, number and configuration suitable for desirably cooling the respective CVT 46 when operated in the respective application and environment.

In various embodiments, the housing outer cover 80B includes an air intake port 150 that fluidly connects the ambient air from an ambient environment external to the housing 80 with the interior chamber 82 of the housing 80. The air intake port 150 is located in the housing outer cover 80B such that the intake port 150 is generally opposite (e.g., disposed face to face) and aligned with a center of the intake fan 98 and an inner radius of the fins 146, (e.g., the intake port 150 is generally opposite (e.g., disposed face to face) and aligned with a head of the clutch bolt 114). As described above, the length of clutch post 102 and the length L of the clutch post slack section 102A are such that the outer face 142 of the intake fan 98 is the generally fixed distance D from the interior face 138 of the outer housing cover 80B. Moreover, the distance D has a length such that the space between the intake fan outer face 142 and the outer housing cover interior face 138 defines a low pressure gap 148. The distance D will also be referred to herein as the width of the low pressure gap 148. The width D of the low pressure gap 148 has a length such that when the intake fan 98 is rotated, via rotation of the clutch post 102 by the prime mover output shaft 86, an area of low pressure is generated within a low pressure gap 148. The area of low pressure in turn generates a vacuum effect, or suction, at the air intake port 150 and within the low pressure gap 148, whereby ambient air will be drawn into the housing interior chamber 82 at or near the center of the intake fan outer face 142. The ambient air drawn into the center of the intake fan 98 is then forced radially outward by the fins 146 into the interior chamber 82, thereby generating airflow within the interior chamber 82 that cools the primary and secondary clutch assemblies 70 and 74 and the drive belt 78, as described below. In various embodiments, the width D of the low pressure gap 148 can be between approximately 0.010 and 0.30 inches, for example, between approximately 0.10 inches to 0.20 inches, e.g., between approximately 0.050 and 0.10.

As used herein, the term 'vacuum effect' will be understood to mean the suction or drawing of air from a first area (e.g., the ambient environment) to a second area (e.g., the interior chamber 82 of the housing 80) caused by creating a lower pressure within the second area (e.g., within the low pressure gap 148) than exists at the first area (e.g., the ambient environment). For example, due to the structure of the intake fan 98 and width D of the low pressure gap 148 (e.g., location of the intake fan outer face 142 relative to the outer cover interior face 138), rotation of the intake fan 98 creates a lower air pressure within the low pressure gap 148 than is present in the ambient environment external to the housing 80, thereby generating a vacuum effect that will draw air from the ambient environment into the housing interior chamber 82 via the air intake port 150.

The housing 80 additionally includes an air exhaust outlet 154 that fluidly connects the interior chamber 82 with the ambient environment. It is envisioned that the exhaust outlet 154 can be formed within the inner cover 80A, within the outer cover 80B, or a combination thereof when the inner and outer covers 80A and 80B are connected. Accordingly, as described above, rotation of the intake fan 98 generates a vacuum, or suction, at the air intake port 150 that draws cool ambient air into the housing interior chamber 82. Subsequently, the rotation of the intake fan 98 (e.g., rotation of the fins 146) disperses the air radially outward to the distal ends, or outer radius, of the fins 146. Thereafter, rotation of the intake fan 98, combined with rotation of the primary and secondary clutch assemblies 70 and 74 and rotation of the drive belt 78, swirls, mixes, and circulates the air through the interior chamber 82, around and across the primary and secondary clutch assemblies 70 and 74 and the drive belt 78, thereby extracting heat from and thermally cooling the primary and secondary clutch assemblies 70 and 74 and the drive belt 78. The heated circulated air is then exhausted from the interior chamber 82 out into the ambient environment through the exhaust outlet 154.

Referring now to FIGS. 4 and 8, in various embodiments, the housing 80 can be formed and structured to control the air flow within interior chamber 82. For example, in various embodiments, the housing outer cover 80B can comprise a clutch dome 158 that defines a clutch alcove 162 within the interior chamber 82 of the housing 80. In such instances, at least the intake fan 98 of the primary clutch assembly 70 will be disposed within the clutch alcove 162, and the interior face 138 of the housing 80 comprises an interior face 138A of a top 166 of the clutch dome 158. Moreover, in such embodiments, the intake fan 98 is disposed within the clutch alcove 162 such that the outer face 142 of the intake fan 98 is located opposite the interior face 138A of the clutch dome top 166 when the CVT 46 is assembled. Therefore, the low pressure gap 148 is defined between the intake fan outer face 142 and the clutch dome top interior face 138A, whereby air is drawn into the housing 80 at the center of the intake fan outer face 142 when the intake fan 98 is rotated. In various embodiments, the housing outer cover 80B can additionally include an air duct 170 fluidly connected to the clutch dome alcove 162, whereby air can be directed and guided from the clutch dome alcove 162, through the air duct 170 to the area of the interior chamber at or near the end of the housing 80 that is opposite the clutch dome 158.

Hence, ambient air drawn into the clutch dome alcove 162, via the air intake port 150, intake fan 98 and low pressure gap 148, can be circulated around and through the clutch alcove 162, then forced through air duct 170 (via the intake fan 98) to the opposing end of the interior chamber 82. Consequently, a portion of the air flow will be exhausted back to the ambient environment, via the exhaust outlet 154, and a remaining portion will be circulated, swirled, and/or mixed through the interior chamber 82, around and across the primary and secondary clutch assemblies 70 and 74 and the drive belt 78, whereafter another portion will be will be exhausted back to the ambient environment. Thereafter, rotation of the intake fan 98 will continue to draw ambient air into the primary clutch alcove 162, circulate the air though the interior chamber 82, and exhaust air back into the ambient environment, thereby cooling the primary and secondary clutch assemblies 70 and 74 and the drive belt 78. In various embodiments, the secondary clutch assembly 74 can include a secondary clutch fan 196, as described below, that aids in the circulation of the air through the interior chamber 82.

Referring now to FIGS. 4, 6, 7 and 9, as described above, the CVT 46 comprises the primary clutch assembly 70 and the secondary clutch assembly 74, wherein the primary clutch assembly 70 includes the stationary sheave 106 and the movable sheave 110. In various embodiments, the secondary clutch assembly 74 comprises a stationary sheave 174 and a movable sheave 178. Additionally, in various embodiments, the clutch dome 158, described above, can be a primary clutch dome (referred to hereafter as the primary clutch dome 158) and the clutch alcove 162 can be a primary clutch alcove (referred to hereafter as the primary clutch alcove 162). In such embodiments, the primary clutch assembly 70 includes the intake fan 98, as described above, and at least the intake fan 98 is disposed within the primary clutch alcove 162 such that the outer face 142 of the intake fan 98 is located opposite the interior face 138A of the primary clutch dome top 166 when the CVT 46 is assembled, thereby defining the low pressure gap 148.

In various instances of such embodiments, the housing outer cover 80B can further comprise a secondary clutch dome 182 that defines a secondary clutch alcove 186 within the interior chamber 82 of the housing 80, wherein at least a portion the stationary sheave 174 of the secondary clutch assembly 74 is disposed within the secondary clutch alcove 186. In various embodiments, the secondary clutch assembly stationary sheave 174 can comprise a plurality of vanes, or fins, 194 integrally formed with or disposed on an outer side of the stationary sheave 174, thereby by providing a secondary clutch fan 196. In various instances, the vanes 194 extend radially outward from a center hub 202 of the secondary clutch assembly stationary sheave 174 such that the secondary clutch fan 196 has an annular shape and configuration wherein the vanes 194 define an annular outer face 198 of the annular secondary clutch fan 196. The secondary clutch fan 196 assists in cooling the primary clutch assembly 70, secondary clutch assembly 74 and drive belt 78 by swirling, mixing, and circulating the air through the interior chamber 82, via rotation of the secondary clutch assembly 74, thereby extracting heat from and thermally cooling the primary and secondary clutch assemblies 70 and 74 and the drive belt 78.

Moreover, in various embodiments, the secondary clutch fan 196 assists in generating the air flow through the housing interior chamber 82, as described below. Particularly, in various embodiments, the housing outer cover 80B comprises an air duct 206 formed between the primary clutch dome 158 and the secondary clutch dome 182. The air duct 206 is fluidly connected to the primary clutch alcove 162 at a proximal end 206A and fluidly connected to the secondary clutch alcove 186 at a distal end 206B. Therefore, the air duct 206 fluidly connects the primary clutch alcove 162 to the secondary clutch alcove 186. The air duct 206 guides and controls the air flow within the interior chamber 82. Particularly, the air flow is initiated at the intake port 150 by the intake fan 98 and low pressure gap 148 drawing the ambient air into the primary clutch alcove 162 at the center of the intake fan 98 (as described above), then the fins 146 force the air radially outward toward the distal ends of the fins 146 and into the primary clutch alcove 162. The location of the intake fan 98 within the primary clutch alcove 162 (as described above) and the shape/structure of the primary clutch alcove 162 direct and force the air flowing from the fins 146 into the primary clutch alcove 162, whereafter the air can be circulated around the primary clutch alcove 162 and forced into the air duct 206 toward the secondary clutch alcove 186. In various instances, the secondary clutch fan 196 is disposed within the secondary clutch alcove 186 having the outer face 198 of the secondary clutch fan 196 located opposite an interior face 138B of the secondary clutch dome top 190 such that a vacuum is generated in the space between the secondary clutch fan outer face 198 and the secondary clutch dome top interior face 138B. This vacuum will also draw air from the primary clutch alcove 162, through the air duct 206, and into the secondary clutch alcove 186.

Therefore, the air is forced into and drawn through the duct 206 via the intake fan 98 and the secondary fan 198, respectively. Consequently, a portion of the air flow will be exhausted back to the ambient environment, via the exhaust outlet 154, and a remaining portion will be circulated around and within the secondary clutch alcove 186, and circulated, swirled, and/or mixed through the interior chamber 82, around and across the primary and secondary clutch assemblies 70 and 74 and the drive belt 78. Thereafter, rotation of the intake fan 98 and the secondary clutch fan 196 will continue to draw ambient air into the primary clutch alcove 162, direct the air into the secondary clutch alcove 186, circulate the air though the interior chamber 82, and exhaust air back into the ambient environment, thereby cooling the primary and secondary clutch assemblies 70 and 74 and the drive belt 78.

Referring now to FIGS. 6, 7 and 9, in various embodiments, the distal end 206B of the air duct 206 is fluidly connected to the secondary clutch alcove 186 and terminates near the center hub 202 of the stationary sheave 174 of the secondary clutch assembly 74. Accordingly, air passing through the air duct 206 from the primary clutch alcove 162 to the secondary clutch alcove 186 will be directed toward the center hub 202 of the stationary sheave 174 of the secondary clutch assembly 74, and more particularly toward the proximal or radially inner ends of the vanes 194. Therefore, the air forced and drawn through the air duct 206 will be directed into the center of the annular secondary clutch fan 196 such that at least a majority (e.g., 80% to 100%) of the surface area of at least one face of each vane 194 will be utilized to force the air radially outward from the center hub 202 to distal ends of the vanes 194. Utilizing at least a majority of the surface area of at least one face of each vane 194 will increase the velocity, volume, flow rate, circulation and thermal cooling efficiency of the air flow generated by the intake fan 98 and secondary clutch fan 196 described above.

Referring now to FIGS. 6, 7, 8 and 9, the air duct 170/206 has a height $H^P$ at the proximal end 170A/206A and a height $H^D$ at the distal end 170B/206B. In various embodiments, the proximal end height $H^P$ can be greater than the distal end height $H^D$, thereby causing the air flowing through the air duct 170/206 to have a greater velocity and flow rate at the distal end 170B/206B than at the proximal end 170A/206A. Particularly, the air flow exiting the air duct 170/206 will have a greater velocity and flow rate than the air entering the air duct 170/206, thereby increasing the velocity, volume, flow rate, circulation and thermal cooling efficiency of the air flow through the interior chamber 82. Additionally, the air duct 170/206 has a width $W^P$ at the proximal end 170A/206A and a width $W^D$ at the distal end 170B/206B. In various embodiments, the proximal end width $W^P$ is greater than the distal end width $W^D$, thereby causing the air flowing through the air duct 170/206 to have a greater velocity and flow rate at the distal end 170B/206B than at the proximal end 170A/206A.

Particularly, the air flow exiting the air duct 170/206 will have a greater velocity and flow rate than the air entering the air duct 170/206, thereby increasing the velocity, volume, flow rate, circulation and thermal cooling efficiency of the air flow through the interior chamber 82. In various embodiments, both the proximal end height $H^P$ and width $W^P$ can be greater than the distal end height $H^D$ and width $W^D$.

Referring now to FIGS. 10, 11, 12 and 13, in various embodiments, the housing 80 can comprise an internal airfoil 210 disposed between the primary and secondary clutch assemblies 70 and 74. The airfoil 210 comprises one or more walls that extend from an interior face 214 of the inner housing cover 80A to the interior face 138 of the housing outer cover 80B. The airfoil 210 can be connected to, and/or integrally form with, the housing inner cover interior face 214 and/or the housing outer cover interior face 138. The airfoil 210 directs the air flow between the area of the interior chamber 82 that is near and/or surrounds the primary clutch assembly 70 and the area of the interior chamber 82 that is near and/or surrounds the secondary clutch assembly 74 to eliminate, or substantially reduce, swirling air, and turbulence from occurring in the area of the interior chamber 82 between the primary and second clutch assemblies 70 and 74.

In various embodiments, the housing inner cover 80A can have a first portion 210A (e.g., a first half) of the airfoil 210 extending outward from the interior face 214 between the primary and secondary clutch assemblies 70 and 74, and the housing outer cover 80B can have a second portion 210B (e.g., a second half) of the airfoil 210 extending outward from the interior face 138 between the primary and secondary clutch assemblies 70 and 74. In various instances, the walls of first portion 210A can align with and contact and the walls of the second portion 210B when the housing inner and outer covers 80A and 80B are connected to form the housing 80 such that air circulating within the interior chamber 82 cannot flow between the first and second portions 210A and 210B, but rather is directed to flow around the airfoil 210 in a more direct path between the primary and secondary clutch assemblies 70 and 74. In various other instances, the walls of first portion 210A can overlap the walls of the second portion 210B, or vice-versa, when the housing inner and outer covers 80A and 80B are connected to form the housing 80 such that air circulating within the interior chamber 82 cannot flow between the first and second portions 210A and 210B, but rather is directed to flow around the airfoil 210 in a more direct path between the primary and secondary clutch assemblies 70 and 74.

In various embodiments, the first and second portions 210A and 210B can be structured such that one or more of the walls, or sections of one or more of the walls, of each of the airfoil first and second portions 210A and 210B extend from the inner faces 214 and 138 of the respective housing inner and outer covers 80A and 80B across the interior chamber 82 and contact the opposing inner face 138 and 214, when the housing inner and outer covers 80A and 80B are connected to form the housing 80. In such embodiments, the walls, or sections of the airfoil walls extending from the housing inner cover interior face 214 will contact and/or overlap the walls, or sections of the airfoil walls extending from the housing outer cover interior face 138, or vice-versa, when the housing inner and outer covers 80A and 80B are connected to form the housing 80 such that air circulating within the interior chamber 82 cannot flow between any section of the first and second portions 210A and 210B, but rather is directed to flow around the airfoil 210 in a more direct path between the primary and secondary clutch assemblies 70 and 74. In various other embodiments, the entire airfoil 210 can extend from the interior face 214 of the housing inner cover 80A such that the walls of the airfoil 210 contact the inner face 138 of the housing outer cover 80B when the housing inner and outer covers 80A and 80B are connected to form the housing 80. Alternatively, in various embodiments, the entire airfoil 210 can extend from the interior face 138 of the housing outer cover 80B such that the walls of the airfoil 210 contact the inner face 214 of the housing inner cover 80A when the housing inner and outer covers 80A and 80B are connected to form the housing 80.

As described above, the airfoil 210 is sized and shaped to direct the air flow between the area of the internal chamber 82 that is near and/or surrounds the primary clutch assembly 70 and the area of the internal chamber 82 that is near and/or surrounds the secondary clutch assembly 74 to eliminate, or substantially reduce, swirling air, and turbulence from occurring in the area of the internal chamber 82 between the primary and second clutch assemblies 70 and 74. Particularly, the air flow is initiated at the intake port 150 by the intake fan 98 and low pressure gap 148 drawing the ambient air into the housing interior chamber 82 (e.g., into the primary clutch alcove 162) at the center of the intake fan 98, whereafter the air can be circulated around the primary clutch assembly 70, (e.g., around the clutch alcove 162) and forced toward the secondary clutch assembly 74 at the opposing end of the interior chamber 82 (e.g., forced into the air duct 170 toward the secondary clutch assembly 74 at the opposing end of the interior chamber 82) or (e.g., forced into the air duct 206 and into the secondary clutch alcove 186). The air will then circulate around the secondary clutch assembly 74 (e.g., circulate within the secondary clutch alcove 186 and around the secondary clutch assembly 74). Thereafter, a portion of the air flow will be exhausted back to the ambient environment, via the exhaust outlet 154, and a remaining portion will be directed back toward the primary clutch assembly 74 (e.g., directed back toward the primary clutch alcove 162 and primary clutch assembly 70) in a substantially direct path via the airfoil 210. Subsequently, the air returning in the substantially direct path from secondary clutch area of the interior chamber 82 will mix with air being drawn into the housing interior chamber (e.g., being drawn into the primary clutch alcove 162), via the intake port 150. The combined fresh and recirculated air will then be circulated around the primary clutch assembly 70, (e.g., around the clutch alcove 162) and forced toward the secondary clutch assembly 74 at the opposing end of the interior chamber 82, as described above, whereafter a portion thereof will be exhausted and a portion recirculated, as described above, thereby extracting heat from and thermally cooling the primary and secondary clutch assemblies 70 and 74 and the drive belt 78.

Hence the airfoil 210 will direct the air within the interior chamber 82 to flow in a substantially direct path from the area surrounding the primary clutch assembly 70, along the area in which the drive belt is disposed, to the area surrounding secondary clutch assembly 74, and from the area surrounding the secondary clutch assembly 74, along the area in which the drive belt is disposed, back to the area surrounding the primary clutch assembly 70. Moreover, the airfoil 210 will prevent the air flow from swirling, mixing and/or causing turbulence within the middle or central area of the interior chamber 82 between the primary and secondary clutch assemblies 70 and 74, thereby increasing the velocity, volume, flow rate, circulation and thermal cooling efficiency of the air flow. The airfoil 210 can have generally any desired shape and size suitable for directing the airflow within the interior chamber 82 as described above. For example, as illustrated by way of example in FIGS. 10, 11, 12 and 13, in various embodiments the airfoil 210 can have an open or closed elongated C-shape, wherein the airfoil 210 has length L that substantial spans the area within the interior chamber 82 between the primary and secondary clutch assemblies 70 and 74. For example, the airfoil 210 can have a length L that positions a first end of the airfoil 210 nearly in contact with the stationary and movable sheaves 106 and 110 of the primary clutch assembly 70 (e.g., the first end is approximately 0.10 to 0.25 inches away from stationary and movable sheaves 106 and 110 of the primary clutch assembly 70), and positions an opposing second end of the airfoil 210 nearly in contact with the stationary and movable sheaves 174 and 178 of the secondary clutch assembly 74 (e.g., the second end is approximately 0.10 to 0.25 inches away from stationary and movable sheaves 174 and 178 of the second clutch assembly 74).

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A continuously variable transmission, said transmission comprising:
   a housing comprising;
      an inner cover; and
      an outer cover connected to the inner cover to provide the housing having an interior chamber defined therein, the housing outer cover comprising:
         a primary clutch dome that defines a primary clutch alcove within the interior chamber of the housing;
         a secondary clutch dome that defines a secondary clutch alcove within the interior chamber of the housing; and
         an air duct connected the primary clutch dome at a proximal end and connected to the secondary clutch dome at a distal end, thereby fluidly connecting the primary clutch dome to the secondary clutch dome, wherein at least one of a height and a width of the air duct is greater at the proximal than at the distal end;
   a primary clutch assembly disposed within the housing interior chamber, the primary clutch assembly comprising:
      a clutch post that is operably connectable to an output shaft of a vehicle prime mover;
      a movable sheave movably mounted on the clutch post;
      a stationary sheave fixedly mounted on the clutch post opposite a front face of the movable sheave; and
      an intake fan that is a separate and independent component from the movable sheave and is fixedly mounted to the clutch post separate and independent from the movable sheave opposite and spaced apart from a rear face of the movable sheave;
   a secondary clutch assembly, the secondary clutch assembly comprising
      a movable sheave movably;
      a stationary sheave; and
      a secondary clutch fan one of disposed on or integrally formed with the secondary clutch assembly stationary sheave; and
   a drive belt operable connecting the primary clutch assembly to the secondary clutch assembly.

2. The transmission of claim 1, wherein the intake fan comprises a plurality of fins that define an outer face of the intake fan, and wherein the intake fan is mounted to the clutch post such that the outer face of the intake fan will be located opposite an interior face of the housing outer cover such that a primary clutch assembly low pressure gap will be defined between the outer face of the intake fan and the interior face of the housing outer cover, whereby air is drawn into the transmission housing, via the air intake port, at least near a center of the intake fan outer face when the intake fan is rotated by the clutch post.

3. The transmission of claim 1, wherein the secondary clutch fan comprises a plurality of vanes one of disposed on or integrally formed with and outer side of the secondary clutch stationary sheave, wherein the vanes extend radially outward from a center hub of the secondary clutch assembly stationary sheave such that the secondary clutch fan has an annular shape.

4. The transmission of claim 2, wherein the secondary clutch fan comprises a plurality of vanes that define an outer face of the secondary clutch fan, and wherein the secondary clutch fan is disposed within the housing such that the outer face of the secondary clutch fan will be located opposite an interior face of the housing outer cover such that a secondary clutch assembly low pressure gap will be defined between the outer face of the secondary clutch fan and the interior face of the housing outer cover, whereby air circulating within the interior chamber is drawn into the secondary clutch assembly low pressure gap when the intake fan is rotated by the drive belt.

5. The transmission of claim 4, wherein the housing outer cover comprises a primary clutch dome that defines a primary clutch alcove within the interior chamber of the housing, wherein the interior face of the housing comprises an interior face of a top of the primary clutch dome, and wherein the intake fan is disposed within the primary clutch alcove such that the outer face of the intake fan is located opposite the interior face of the primary clutch dome top such that the primary clutch assembly low pressure gap is defined therebetween, whereby air is drawn into the transmission housing, via the air intake port, at least near a center of the intake fan outer face when the intake fan is rotated by the clutch post.

6. The transmission of claim 5, wherein the housing outer cover comprises a secondary clutch dome that defines a secondary clutch alcove within the interior chamber of the housing, wherein the interior face of the housing comprises an interior face of a top of the secondary clutch dome, and wherein the secondary clutch fan is disposed within the secondary clutch alcove such that the outer face of the secondary clutch fan is located opposite the interior face of the secondary clutch dome top such that the secondary clutch assembly low pressure gap is defined therebetween, whereby air circulating within the interior chamber is drawn into the secondary clutch assembly low pressure gap.

7. The transmission of claim 6, wherein the housing comprises an air duct formed between the primary clutch dome and the secondary clutch dome fluidly connecting the primary clutch dome to the secondary clutch dome, the air duct being fluidly connected to the primary clutch dome at a proximal end and fluidly connected to the secondary clutch dome at a distal end such that air can flow through the duct from the primary clutch alcove to the secondary clutch alcove.

8. The transmission of claim 7, wherein the secondary clutch fan vanes extend radially outward from a center hub of the secondary clutch assembly stationary sheave such that the secondary clutch fan has an annular shape, and wherein the air duct distal end terminates in close proximity to the center hub such that air flowing through the duct from the primary alcove will be directed toward the center hub.

9. The transmission of claim 8, wherein at least one of the inner cover and the outer cover comprises at least a portion of an airfoil disposed on at least one of an interior face of the inner cover and an interior face of the outer cover, the airfoil comprising one or more walls that span the housing interior chamber from the inner cover interior face to the outer cover interior face between the primary and secondary clutch assemblies.

10. The transmission of claim 9, wherein the airfoil comprises the one or more walls extending from the inner cover that span the housing interior chamber from the inner cover interior face to the outer cover interior face when the housing inner and outer covers are connected.

11. The transmission of claim 9, wherein the airfoil comprises the one or more walls extending from the outer cover that span the housing interior chamber from the outer cover interior face to the inner cover interior face when the housing inner and outer covers are connected.

12. The transmission of claim 9, wherein the airfoil comprises a first portion extending outward from the inner cover interior face, and a second portion extending outward from the outer cover interior face, wherein the first and second portions align with and contact each other when the housing inner and outer covers are connected.

13. The transmission of claim 10, wherein the airfoil comprises a first portion extending outward from the inner cover interior face, and a second portion extending outward from the outer cover interior face, wherein the first and second portions overlap when the housing inner and outer covers are connected.

14. A continuously variable transmission housing, said housing comprising:
an inner cover; and
an outer cover connected to the inner cover to provide the housing having an interior chamber defined therein, the interior chamber structured to enclose a continuously variable transmission comprising a primary clutch assembly, a secondary clutch assembly, and a drive belt operably connecting the primary and secondary clutches, the outer cover comprising:
a primary clutch dome that defines a primary clutch alcove within the interior chamber of the housing, wherein at least a portion of a primary clutch assembly is disposed within the primary clutch alcove;
a secondary clutch dome that defines a secondary clutch alcove within the interior chamber of the housing, wherein at least a portion of a secondary clutch assembly is disposed within the primary clutch alcove;
an air intake port disposed in the outer cover such that the air intake port will be opposite a center of the primary clutch assembly when the primary clutch, secondary clutch and drive belt are enclosed within the housing; and
an air duct formed between the primary clutch dome and the secondary clutch dome fluidly connecting the primary clutch dome to the secondary clutch dome, the air duct being fluidly connected to the primary clutch dome at a proximal end and fluidly connected to the secondary clutch dome at a distal end, wherein at least one of a height and a width of the air duct is greater at the proximal than at the distal end, wherein
at least one of the inner cover and the outer cover comprises at least a portion of an airfoil disposed on at least one of an interior face of the inner cover and an interior face of the outer cover, the airfoil comprising one or more walls that span the housing interior chamber between the inner cover interior face and the outer cover interior face between the primary and secondary clutch domes.

15. The housing of claim 14, wherein the airfoil comprises the one or more walls extending from the inner cover that span the housing interior chamber from the inner cover interior face to the outer cover interior face when the housing inner and outer covers are connected.

16. The housing of claim 14, wherein the airfoil comprises the one or more walls extending from the outer cover that span the housing interior chamber from the outer cover interior face to the inner cover interior face when the housing inner and outer covers are connected.

17. The housing of claim 14, wherein the airfoil comprises a first portion extending outward from the inner cover interior face, and a second portion extending outward from the outer cover interior face, wherein the first and second portions align with and contact each other when the housing inner and outer covers are connected.

18. The transmission of claim 14, wherein the airfoil comprises a first portion extending outward from the inner cover interior face, and a second portion extending outward from the outer cover interior face, wherein the first and second portions overlap when the housing inner and outer covers are connected.

* * * * *